US008687897B2

(12) United States Patent
Van Reeth et al.

(10) Patent No.: US 8,687,897 B2
(45) Date of Patent: Apr. 1, 2014

(54) METHOD FOR DETECTING ORIENTATION OF CONTOURS

(75) Inventors: Eric Van Reeth, Grenoble (FR); Pascal Bertolino, Seyssinet-Pariset (FR); Nicolas Marina, Voreppe (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 436 days.

(21) Appl. No.: 12/983,643

(22) Filed: Jan. 3, 2011

(65) Prior Publication Data

US 2011/0164831 A1 Jul. 7, 2011

(30) Foreign Application Priority Data

Jan. 5, 2010 (FR) ...................................... 10 50034

(51) Int. Cl.
*G06K 9/00* (2006.01)
*H04N 3/30* (2006.01)
*G06T 7/00* (2006.01)
*G06K 9/74* (2006.01)

(52) U.S. Cl.
CPC ............... *H04N 3/30* (2013.01); *G06T 7/0083* (2013.01); *G06K 9/74* (2013.01)
USPC ...................................................... 382/218

(58) Field of Classification Search
CPC .............................................. G06K 9/74
USPC .................................................. 382/240, 218
See application file for complete search history.

(56) References Cited

U.S. PATENT DOCUMENTS

| 6,005,978 A * | 12/1999 | Garakani ...................... 382/218 |
| 6,167,150 A | 12/2000 | Michael et al. |
| 6,754,398 B1 * | 6/2004 | Yamada ........................ 382/260 |
| 6,788,826 B1 | 9/2004 | Van de Velde et al. |
| 6,901,110 B1 * | 5/2005 | Tsougarakis et al. .... 375/240.12 |
| 2006/0245500 A1 * | 11/2006 | Yonovitz .................. 375/240.19 |
| 2008/0266432 A1 * | 10/2008 | Tsuruoka ..................... 348/294 |
| 2008/0317352 A1 * | 12/2008 | Ros et al. ..................... 382/191 |
| 2009/0024580 A1 * | 1/2009 | Obrador ........................... 707/3 |

FOREIGN PATENT DOCUMENTS

| WO | WO-2004104928 A1 | 12/2004 |
| WO | WO-2007059795 | 5/2007 |

OTHER PUBLICATIONS

Miao Qiguang; Wang Baoshu; , "A Novel Image Fusion Method Using Contourlet Transform," Communications, Circuits and Systems Proceedings, 2006 International Conference on , vol. 1, No., pp. 548-552, Jun. 25-28, 2006.*

Mencattini, A.; Salmeri, M.; Lojacono, R.; Frigerio, M.; Caselli, F., "Mammographic Images Enhancement and Denoising for Breast Cancer Detection Using Dyadic Wavelet Processing," Instrumentation and Measurement, IEEE Transactions on , vol. 57, No. 7, pp. 1422,1430, Jul. 2008.*

Starck, Jean-Luc, et al: "The Curvelet Transform for Image Denoising," IEEE Transactions on Image Processing, vol. 11, No. 6, Jun. 2002, pp. 670-684.

(Continued)

*Primary Examiner* — Hadi Akhavannik
(74) *Attorney, Agent, or Firm* — Gardere Wynne Sewell LLP

(57) ABSTRACT

A method for detecting orientation of the contours in an image, performs an initial transformation of the image using a non-decimated multi-resolution transform, segments the image into a plurality of blocks, determines the optimal resolution for each block, and detects the predominant direction of contour for each of the blocks.

20 Claims, 7 Drawing Sheets

(56) References Cited

OTHER PUBLICATIONS

Do, Minh N., et al: "Contourlets," Beyond Wavelets, J. Stoeckler and G. V. Welland (Eds.), copyright 2001 by Academic Press, Inc., pp. 1-27.

Peyre, Gabriel, et al: "Geometrical Image Estimation with Orthogonal Bandlet Bases," pp. 1-10.

Le Pennec, E., et al.: "Bandelet Image Approximation and Compression," Mar. 2005 (38 pages).

Do, Minh N., et al.: "The Contourlet Transform: An Efficient Directional Multiresolution Image Representation," IEEE Transactions on Image Processing (16 pages).

Le Pennec, E., et al.: "Bandelettes et representation geometrique des images," Polytechnique (4 pages).

Lindeberg, T.: "Principles for Automatic Scale Selection," Technical Report ISRN KTH/NA/P-98/14-SE, Aug. 1998 (46 pages).

Mallat, S., et al.: "A Review of Bandlet Methods for Geometrical Image Representation," Springer Science + Business Media B.V. 2007 (30 pages).

Peyre, G.: "Geometric multi-echelles pour les images et les textures," Doctorate Thesis at L'Ecole Polytechnique, Dec. 13, 2005 (150 pages).

Bresenham, J.: "Pixel-Processing Fundamentals," IEEE, CGA, 16(1) :74-82, Jan. 1996 (10 pages).

Eric Van Reeth, Pascal Bertolino, Marina Nicolas, Jean-Marc Chassery, "Adaptive Edge Orientation Analysis," STMicroelectronics, 12 rue Jules Horowitz, Grenoble, France; GIPSA-LAB, 961 rue de la Houille Blanche, Grenoble, France, 11 total pages.

Pietro Perona, "Orientation Diffusions," IEEE Transactions on Image Processing, vol. 7, No. 3, Mar. 1998, pp. 457-467.

EPO Search Report for EP11150007 mailed Apr. 7, 2011 (6 pages).

INPI Search Report and Written Opinion for FR1050034 mailed Aug. 27, 2010 (8 pages).

\* cited by examiner

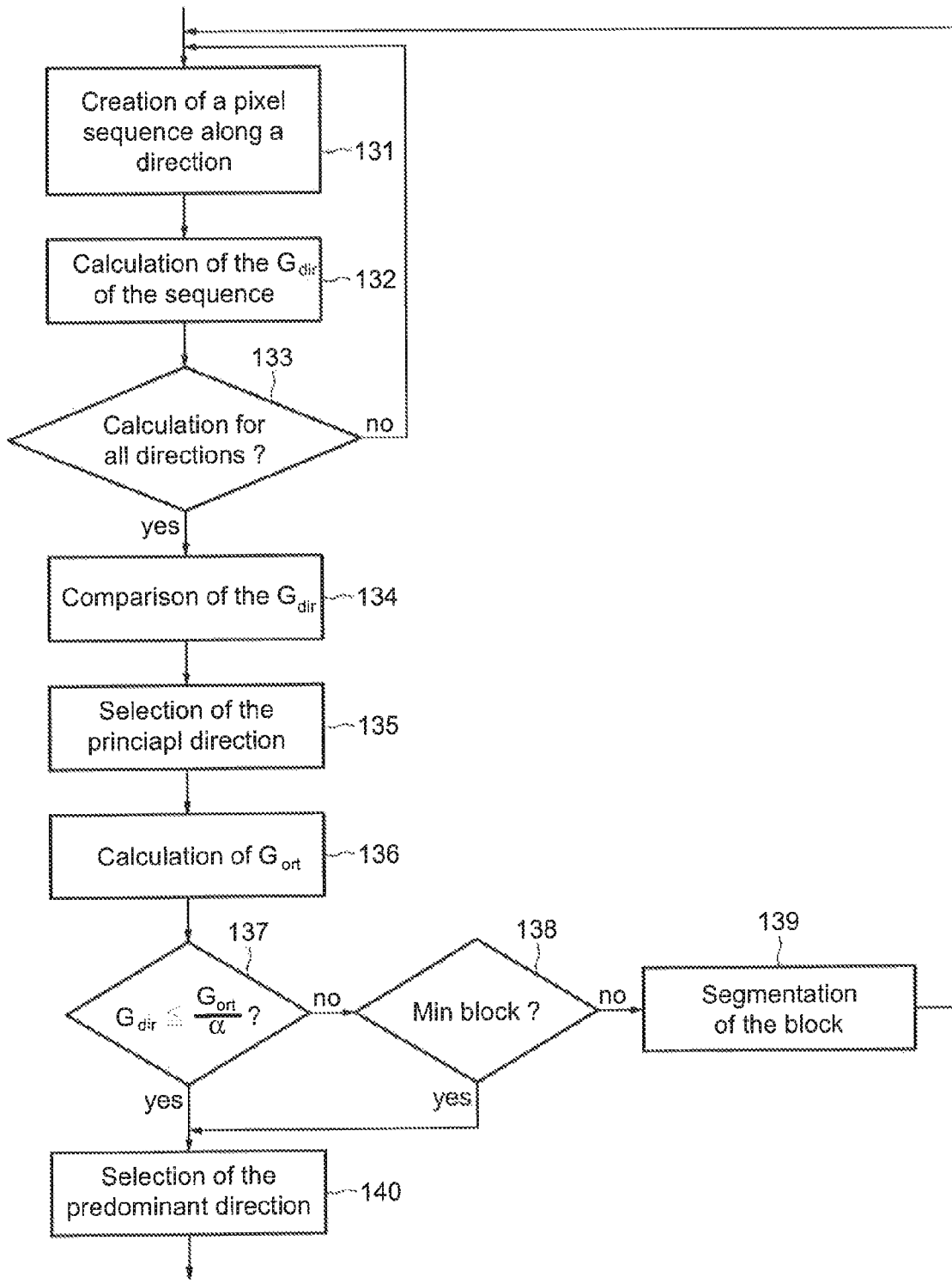

FIG.8a
FIG.8b
FIG.9a
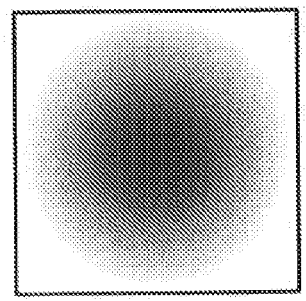
FIG.9b
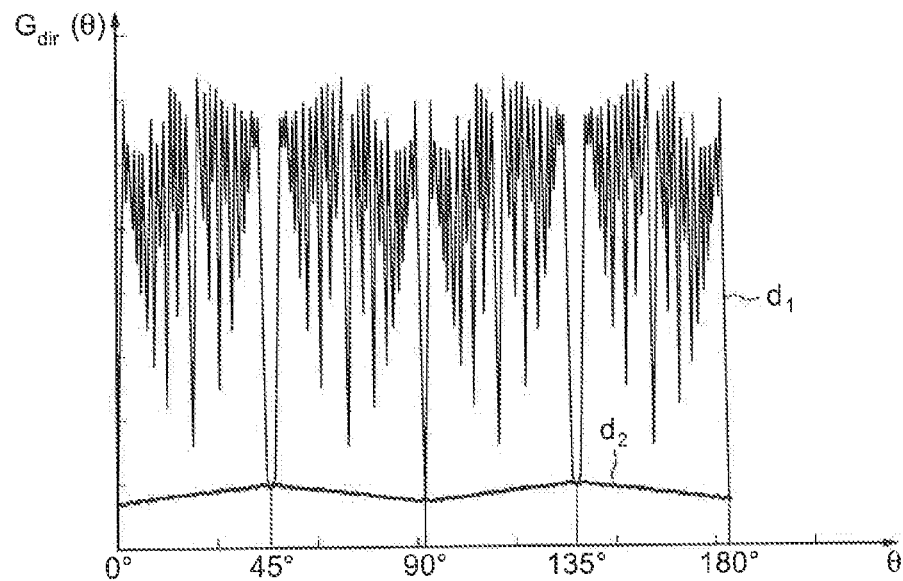

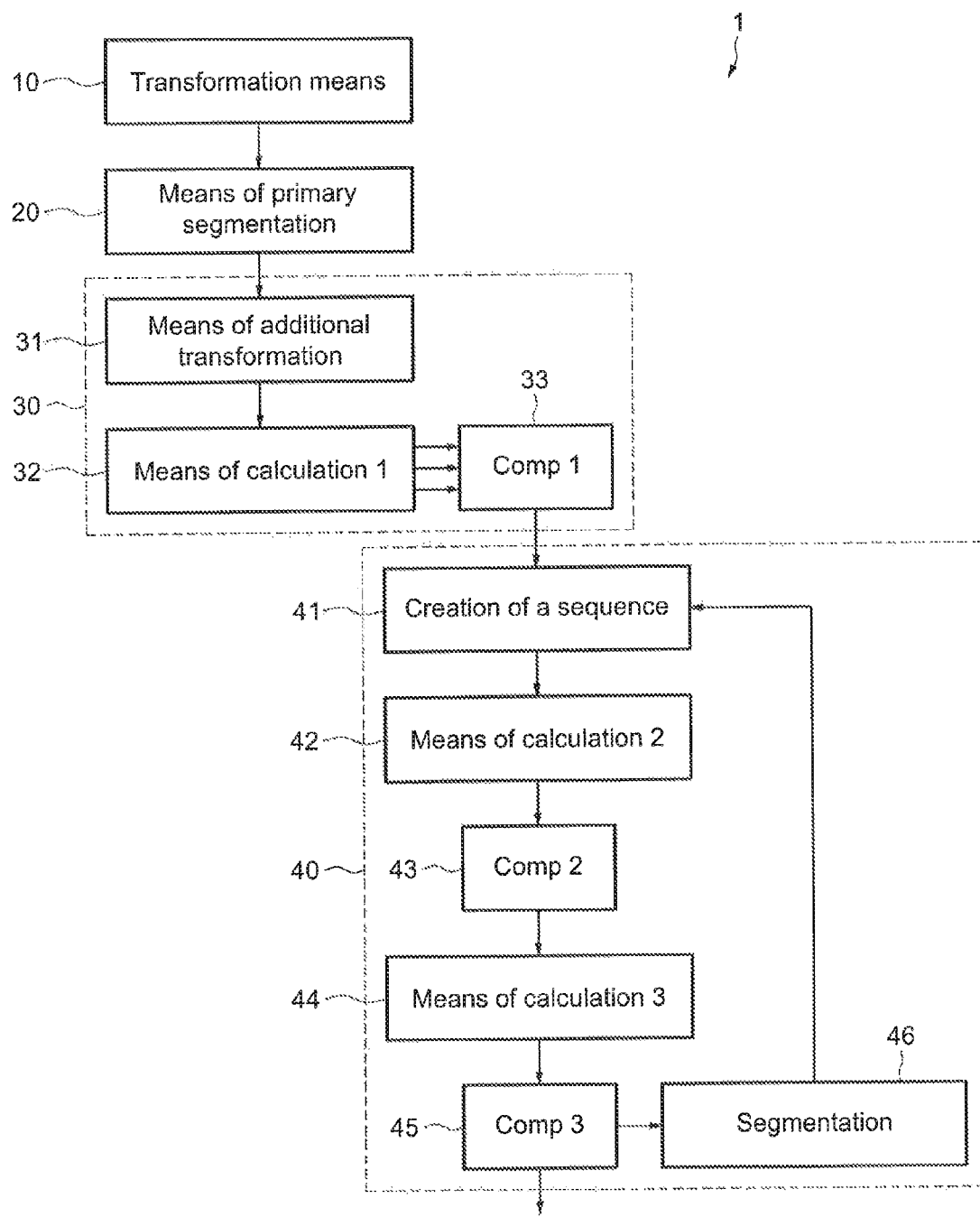

METHOD FOR DETECTING ORIENTATION OF CONTOURS

PRIORITY CLAIM

This application claims priority from French Application for Patent No. 10-50034 filed Jan. 5, 2010, the disclosure of which is hereby incorporated by reference.

TECHNICAL FIELD

The invention relates to image processing, and more particularly to detecting the orientation of contours in an image.

BACKGROUND

Image processing is a highly developed subject of study. More particularly, the description of the geometry of the objects of an image is of great interest for the major application sectors of image processing such as, for example, denoising, improvement of resolution, compression, or image restoration in general.

Ever more complex techniques have been implemented to solve these problems and obtain images of better quality. Numerous studies have thus revealed that the quality of an image is strongly correlated with the quality of the contours.

A logical evolution of the methods has been to render these processing operations adaptive to the content of the image. They thus make it possible to adapt the processing operations in a local manner over certain image areas, by utilizing the homogeneity of certain criteria such as grey levels, texture membership, or contour membership.

The wavelet transform of a signal such as the signal of an image is a mathematical tool used in signal processing. A wavelet is a function comparable with a brief oscillation. It is a mathematical function used to divide a function or a signal in continuous time into various components of scale corresponding to various frequency bands. Each scale component can then be studied at the appropriate resolution.

Carrying out both a frequency decomposition and a temporal decomposition, the wavelet transform presents advantages for representing functions comprising discontinuities and/or narrow spikes with respect to the traditional Fourier transform which performs only a frequency decomposition. The wavelet transform also presents advantages with respect to the Fourier transform for decomposing and recomposing non-periodic or non-stationary, finite signals.

The wavelet transform is a very effective tool for studying the contours of an image by virtue of the separation that it performs between the high and the low frequencies but especially by virtue of the flexibility that it offers in regard to adaptation to resolution.

Transforming an image with the aid of the wavelet transform amounts to separating it into two domains: an approximation domain and a detail domain. The approximation domain comprises the low frequencies of the image corresponding to the continuous components, whereas the detail domain comprises the high frequencies of the image corresponding to the strong variations generally defining a contour.

By virtue of the wavelets, multi-resolution analysis procedures make it possible to represent images in relevant spaces. The information given by multi-resolution approaches is fundamental for the analysis of images, and most particularly for studying the characteristics of the contours.

Theoretical procedures based on geometric wavelets, aimed at detecting the homogeneity of the grey levels along a direction, have been created. Procedures using "bandlets", "ridgelets" or "curvelets", or "contourlets" have thus been used.

All these techniques concentrate principally on using the regularity of the wavelet coefficients along certain directions to improve various applications such as denoising or compression for example.

The document WO 2007/059795, the disclosure of which is hereby incorporated by reference, describes a method for improving a signal by using multi-scale grouping bandlets. This procedure makes no choice of resolution, and uses an iterative segmentation which uses significant calculation space and time. The pixel rearrangement procedure used for direction detection in this method exhibits malfunctions entailing the appearance of favored directions.

The document "The curvelet transform for image denoising" written by J. L. Starck et al. and published in the IEEE scientific journal (vol. 11, No. 6, June 2002), the disclosure of which is hereby incorporated by reference, describes the use of "curvelets" which use the "à trous" wavelet transform, and carry out a frequency-based decomposition of the image, but which make no choice of resolution, nor any choice of direction of contours, nor any segmentation as a function of a resolution adapted to detail. The technique described in this document is adapted only to certain types of image processing operations such as noise reduction. On the other hand, this technique is not adapted to image processing operations of encoding or interpolation type, because it allows neither a choice of resolution, nor a choice of direction.

Certain geometric flow creation techniques not using wavelets have also been studied previously. Thus, in the document "Orientation diffusions" drafted by P. Perona and published in the IEEE scientific journal (vol. 7, No. 3, March 1998), the disclosure of which is hereby incorporated by reference, is described an approach which uses grey levels rather than the wavelet transform. The iterative procedure described is based on the diffusion of the orientations of the gradients of an image. This approach does not make it possible to get a global picture of the contour, and the discontinuities remain difficult to detect.

SUMMARY

According to one mode of implementation and embodiment, it is proposed to combine the wavelet multi-resolution approaches with a directional analysis procedure to obtain therefrom a precise and unbiased directional flow of the contours of an image. The directional analysis procedure uses an adaptive segmentation and is non-iterative so as possibly to allow a saving in calculation time and parallelization of calculation.

According to one aspect, there is proposed, in one mode of implementation, a method for detecting orientation of the contours in an image.

This method comprises the following steps: an initial transformation of the image using a non-decimated multi-resolution transform, such as, for example, an "à trous" wavelet transform or a Laplacian pyramid, the non-decimated transformation allowing the separation of the approximation and details of the image; a segmentation of the image into a plurality of blocks, the blocks possibly being of the same dimension, a determination of the optimal resolution for each block, a detection of the predominant direction of contour for each of the blocks.

In one mode of implementation, the blocks constitute primary blocks arising from a primary segmentation of the image. The predominant direction of the contour for each primary block is then detected.

The blocks can have diverse shapes such as a square, rectangular or lozenge shape. The use of square blocks makes it possible to represent all the directions in a homogeneous manner.

The blocks can also constitute divisional blocks resulting from an initial division of the primary blocks, and the predominant direction of contour for each divisional block is then picked out.

Advantageously, the determination of the optimal resolution can comprise at least one second non-decimated multi-resolution transform of the image, each non-decimated multi-resolution transform of the image corresponding to a scale.

By repeating the non-decimated multi-resolution transform, such as an "à trous" wavelet transform, on the approximation images obtained, a frequency-based description of the image at various resolutions is obtained. The resolution of the transformed image decreases with the number of repetitions of the transform, the number of repetitions corresponding to the scale.

The non-decimated multi-resolution transform used may be a dyadic transform, thus implying in this case that the resolution is divided by two at each scale, that is to say at each transform. If J is the scale of a non-decimated multi-resolution transform, the scale corresponding to the number of transforms that the image has undergone, the resolution of the transformed spaces decreases as $2^{-J}$.

In FIG. 1 has been represented a diagram of a non-decimated multi-resolution decomposition, such as an "à trous" wavelet transform used here for determining the optimal resolution. In the case where a dyadic non-decimated multi-resolution transform is used for decomposition, the optimal resolution will be of the form $2^{-J_{opt}}$.

In FIG. 1 this is represented an exemplary image decomposition at three levels, that is to say at the scales J=1, J=2 and J=3. It is possible to carry out image decompositions at n levels, n at least equal to 1. Each detail image $D_1$, $D_2$ and $D_3$ shows up contours at a particular band of frequencies. For example, the high-frequency parts of the image, such as fine contours, appear in the first detail image $D_1$ at the resolution $2^{-1}$, the finest for a dyadic transform, whereas the low-resolution contours such as wider contours, appear more strongly in the third detail image $D_3$ at the coarser resolution $2^{-3}$ for a dyadic transform.

The use of a non-decimated, that is to say non-undersampled, multi-resolution decomposition such as an "à trous" wavelet transform, makes it possible to preserve the same image size at all resolutions. Thus, redundancies which are used as extra information for deciding the orientation of a contour are introduced at low resolution.

The determination of the optimal resolution for a block preferably comprises a calculation of an amplitude of the detail coefficients for each resolution, and a selection of the optimal resolution corresponding to the resolution for which the amplitude of the detail coefficients is a maximum.

The determination of the optimal resolution is carried out preferably for a primary block arising from a primary segmentation.

In a case where a wavelet transform is used as non-decimated multi-resolution transform, the wavelet coefficients of the wavelet transform correspond to the detail coefficients.

By locally choosing the resolution most adapted to each contour, the direction of the contour is thereby specified. For this purpose the image, and more particularly the detail image, is segmented into primary blocks, for example into squares of 16 pixels by 16 pixels. It is then possible to choose the best resolution for each block, as a function of the type of detail existing within the block.

To determine the adapted resolution suitable for a block, the amplitude of the detail coefficients is calculated for each resolution by calculating, for example, the difference between the maximum detail coefficient and the minimum detail coefficient for a block at a resolution. The optimal resolution of a block is then that for which the detail coefficients have the highest amplitude. This simple and fast approach makes it possible to obtain much more precise results when detecting contour directions since each contour is represented at its optimal resolution.

Preferably, the detection of the predominant direction of contours of a block comprises: a) a detection of a principal direction of the block, b) a test of satisfaction of a direction criterion for the block, c) a selection of the principal direction as predominant direction of the block if the direction criterion is satisfied, d) a segmentation of the block into four equal square divisional blocks, if the direction criterion is not satisfied in step b), e) a reiteration of steps a) to d) until the direction criterion is satisfied.

Thus, it is possible to segment the blocks successively so as to obtain a predominant direction for a block satisfying the direction criterion, the blocks possibly being of different sizes.

Preferably, the detection of a principal direction of a block comprises: a creation of a sequence of pixels for each possible direction in the block, a calculation of a homogeneity criterion for each sequence of pixels, a selection of the principal direction of the block, the principal direction corresponding to the direction for which the criterion of homogeneity of the sequence of pixels corresponds to a maximum homogeneity.

Depending on the way in which the criterion is defined from the mathematical point of view, to correspond to a maximum homogeneity, the homogeneity criterion may be a minimum or maximum.

The criterion of homogeneity of a direction of a block corresponds to the homogeneity of the pixels of the block along the direction, that is to say preferably to the integration over the block of the absolute values of the gradients of detail coefficients along the direction.

Let $d(\theta)$ be the calculated sum of the absolute values of the differences between two successive values of pixels of a sequence of pixels $S(\theta)$ in one dimension. For a sequence of size $N^2$, arising from a square block of N pixels by N pixels, we therefore have:

$$d(\theta) = \sum_{i=1}^{N^2-1} |S(\theta)[i+1] - S(\theta)[i]| \quad (1)$$

The sought-after direction $\theta$ corresponds to the direction which minimizes $d(\theta)$. It is that for which the sequence exhibits the fewest discontinuities, and therefore that which has the most chance of being the direction of the dominant contour.

The pixel sequence created for each possible direction can optionally take account of the line jumps for each direction, doing so by modifying equation 1 accordingly. Thus, the homogeneity criterion is calculated for each sequence of pixels only on the basis of the consecutive pixels, away from line jumps, in the block along a direction. An appropriate normalization factor is then applied.

Preferably, to calculate the homogeneity criterion for a sequence, a number of orthogonal wavelet transforms of the sequence, such as a Haar wavelet transform for example, corresponding to the number corresponding to the scale of the block from which one is subtracted is carried out beforehand.

It is preferable to calculate d(θ) not over the sequences of pixels but over the wavelet transforms. The choice of the resolution at which S(θ) is transformed is related to the level of resolution of the block at the origin of the sequence.

Thus, the sequences containing wavelet coefficients at the resolution $2^{-1}$, i.e. the scale J=1, will not be transformed, whereas the sequences at the other resolutions $2^{-2}$ and $2^{-3}$, i.e. the scales J=2 and J=3, will be transformed respectively once and twice.

The concept of continuity along a direction θ can therefore be calculated in the following manner through the calculation of the homogeneity criterion, with $WT_J(S(\theta))$ the orthogonal wavelet transform of S(θ) at the resolution $2^{-J}$.

$$G_{dir}(\theta) = \sum_{i=1}^{N^2-1} |WT_{J-1}(S(\theta)[i+1]) - WT_{J-1}(S(\theta)[i])| \quad (2)$$

The angle θ associated with the block is that which minimizes the value of $G_{dir}(\theta)$.

Preferably, the direction criterion for a block comprises a minimum block size and/or a criterion of homogeneity below a homogeneity threshold.

A block is therefore segmented into four divisional blocks if the homogeneity criterion is above the homogeneity threshold, that is to say if the detected principal direction is not considered to be predominant due to the fact that there exists, for example, more than one contour direction in the block. The block will not be segmented on the other hand if the homogeneity criterion is below the homogeneity threshold, and/or if the size of the block considered is equal to the minimum block size.

The homogeneity threshold for a block can advantageously correspond to the integration over the block of the absolute values of the intrinsic gradients of detail coefficients of the block such as the vertical and horizontal gradients of detail coefficients.

The combined consideration of the intrinsic gradients of detail coefficients such as the vertical and horizontal gradients in the homogeneity threshold makes it possible to avoid non-detection of the horizontal or vertical contours.

Another solution would consist for example in using the diagonal gradients corresponding to the +45° and −45° directions.

The creation of a sequence of pixels for a direction in the block is preferably carried out on the basis of an algorithm chaining together the neighboring pixels, such as the Bresenham algorithm.

The use of the Bresenham algorithm, to find the chaining to be carried out, makes it possible to minimize at each step the error made with respect to the continuous straight line representing the same angle, chaining together neighboring pixels.

It is also possible to use algorithms other than that of Bresenham, provided that they are based on a chaining of neighboring pixels aimed at minimizing the error made with respect to the continuous straight line, this minimization not then being done gradually but on a straight line segment.

This furthermore makes it possible to avoid the appearance of favored directions during detection. The chaining of neighboring pixels is also more representative of the way in which straight lines are represented in natural images.

The number of Bresenham straight lines that can be created inside a region increases with the size of the region. The angular resolution therefore increases with the size of the region since the number of angles that can be discriminated is bigger. Moreover, searching for the dominant direction over a large number of pixels increases the robustness of the result with respect to possible spurious noise or directions.

According to another aspect, there is proposed in one embodiment, a system for detecting orientation of the contours in an image.

It advantageously comprises means of initial transformation of the image which are able to carry out a non-decimated multi-resolution transformation of the image, segmentation means able to segment the image into a plurality of blocks, means for determining the optimal resolution for each block, means for detecting the predominant direction of contour for each of the blocks.

Advantageously, the means for determining the optimal resolution comprise means of additional transformations able to carry out at least one second non-decimated multi-resolution transform of the image, each multi-resolution transform of the image corresponding to a scale.

Preferably, the means for determining the optimal resolution comprise first calculation means able to calculate an amplitude of the detail coefficients for each resolution, and first comparison means able to compare the amplitudes of the detail coefficients and to select the optimal resolution corresponding to the resolution for which the amplitude of the detail coefficients is a maximum.

The means for detecting the predominant direction of contour of a block can advantageously comprise means for detecting a principal direction of the block, means for testing satisfaction of a direction criterion for the block, means for segmenting the block into four divisional blocks.

Preferably, the means for detecting a principal direction of a block comprise means for creating a sequence of pixels for each possible direction in the block, second calculation means able to calculate a homogeneity criterion for each sequence of pixels, second comparison means able to compare the criteria of homogeneities of a block and to select the principal direction of the block, the principal direction corresponding to the direction for which the criterion of homogeneity of the sequence of pixels corresponds to a maximum homogeneity.

The second calculation means preferably comprise means able to carry out a number of orthogonal wavelet transforms of the sequence corresponding to the number corresponding to the scale of the block from which one is subtracted.

The satisfaction testing means can advantageously comprise third calculation means able to calculate a homogeneity threshold corresponding to the integration over the block of the absolute values of the intrinsic gradients of detail coefficients of the block such as the vertical and horizontal gradients of detail coefficients.

The satisfaction testing means comprise third comparison means able to compare the homogeneity criterion delivered by the second comparison means with the homogeneity threshold and to compare the size of the block with a minimum threshold of block size.

Advantageously, the means for creating a sequence of pixels for a direction in the block can comprise means able to construct a sequence of pixels on the basis of an algorithm chaining together the neighboring pixels, such as the Bresenham algorithm.

BRIEF DESCRIPTION OF THE DRAWINGS

Other advantages and characteristics of the invention will be apparent on examining the detailed description of wholly non-limiting embodiments and modes of implementation and the appended drawings in which:

FIG. 4 illustrates in a schematic manner a method for detecting the predominant direction of contours for each block, according to one mode of implementation;

FIGS. 8a and 8b present a procedure for creating a sequence of pixels in one dimension according to the prior art, FIGS. 9a and 9b illustrate the phenomenon of favored directions which is observed when using the creation of pixels of the prior art, FIG. 10 presents, in a schematic manner, an embodiment of a system for detecting orientation of the contours in an image.

DETAILED DESCRIPTION OF THE DRAWINGS

Figure 1:
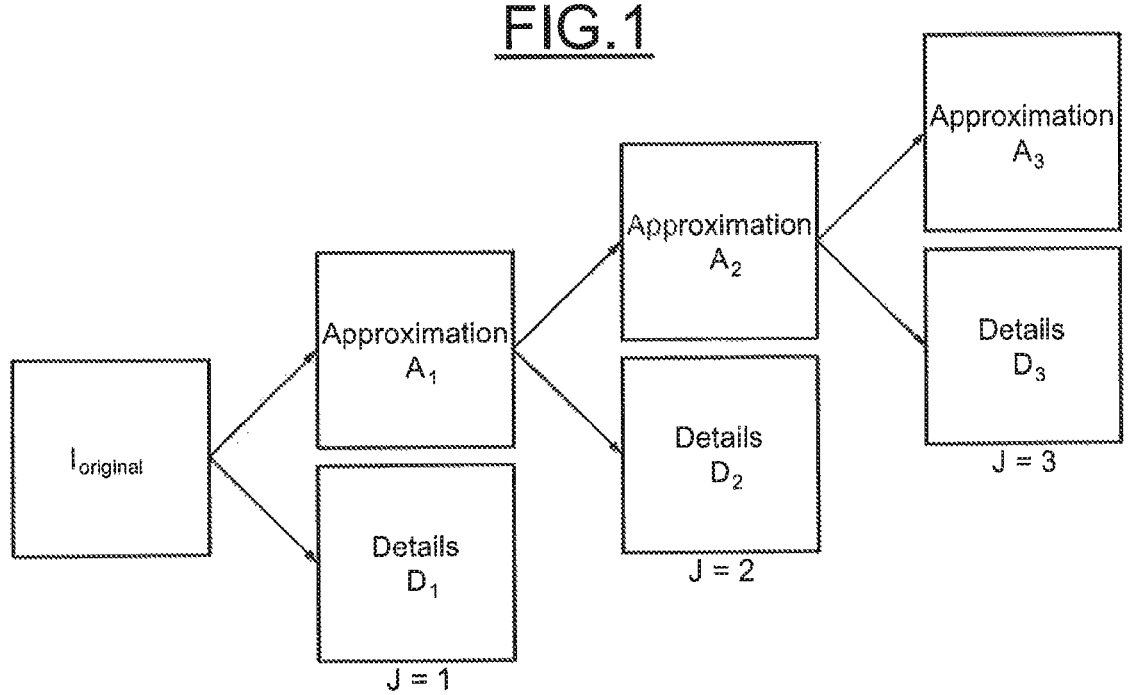
FIG. 1, already described, represents in a schematic manner a succession of non-decimated multi-resolution decompositions.
Figure 2:
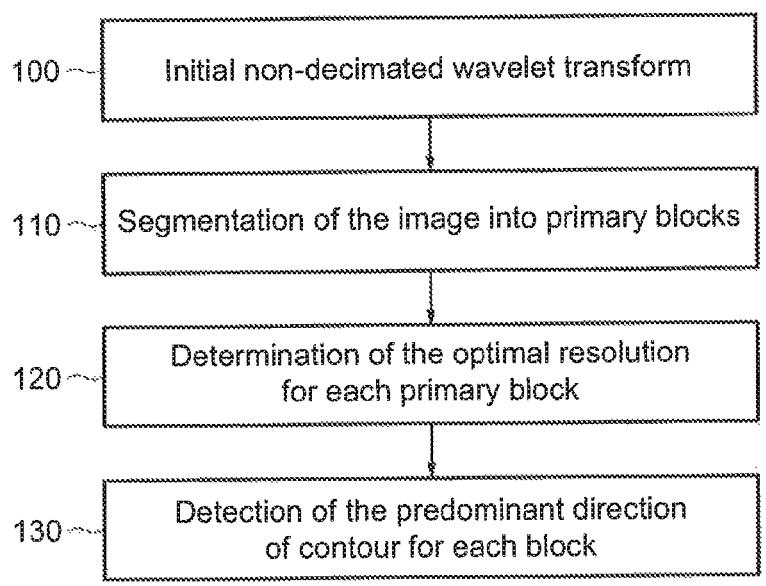
FIG. 2 schematically represents according to one mode of implementation a method for detecting orientation of the contours in an image.

FIG. 2 represents, in a schematic manner, a method for detecting orientation of the contours in an image according to one mode of implementation.

This method comprises an initial step 100 of transforming the image by using, in the example illustrated here, a non-decimated wavelet transform.

The wavelet transform is a more or less oscillating mathematical function of zero mean, chosen as an analysis and multi-scale reconstruction tool. The use of a non-decimated, that is to say non-undersampled, wavelet transform such as an "à trous" wavelet transform, makes it possible to preserve the same image size at all resolutions and therefore the same number of pixels at all resolutions.

The method thereafter comprises an image segmentation step 110 in which the image is segmented, in the example presented here, into square primary blocks of the same dimensions. These primary blocks are preferably divisible into four equal square divisional blocks. The size of the primary block is chosen to be a maximum, thereby hoping reasonably to isolate at most one object of the image per block. Indeed, if the primary block is a square of 4 pixels, it can theoretically be divided only once into four divisional blocks of one pixel. On the other hand a primary block of 16×16 pixels can be divided a first time into four blocks of 8×8 pixels which will also be able to be divided once into four blocks of 4×4 pixels. A divisional block size of less than 4×4 pixels is hardly relevant, since it affords very little insight about the direction of the contour.

In a following step 120, the optimal resolution is determined for each primary block. Thus, for each primary block arising from the image segmentation of the previous step 110, a process is implemented to determine the optimal resolution for the contour or contours contained in a primary block.

Finally, in a last step 130, the direction of the predominant contour is detected for each block, the blocks considered possibly being primary blocks or divisional blocks arising from at least one division of the primary block. The division is iterated so as to have only a single contour direction per block.

Figure 3:
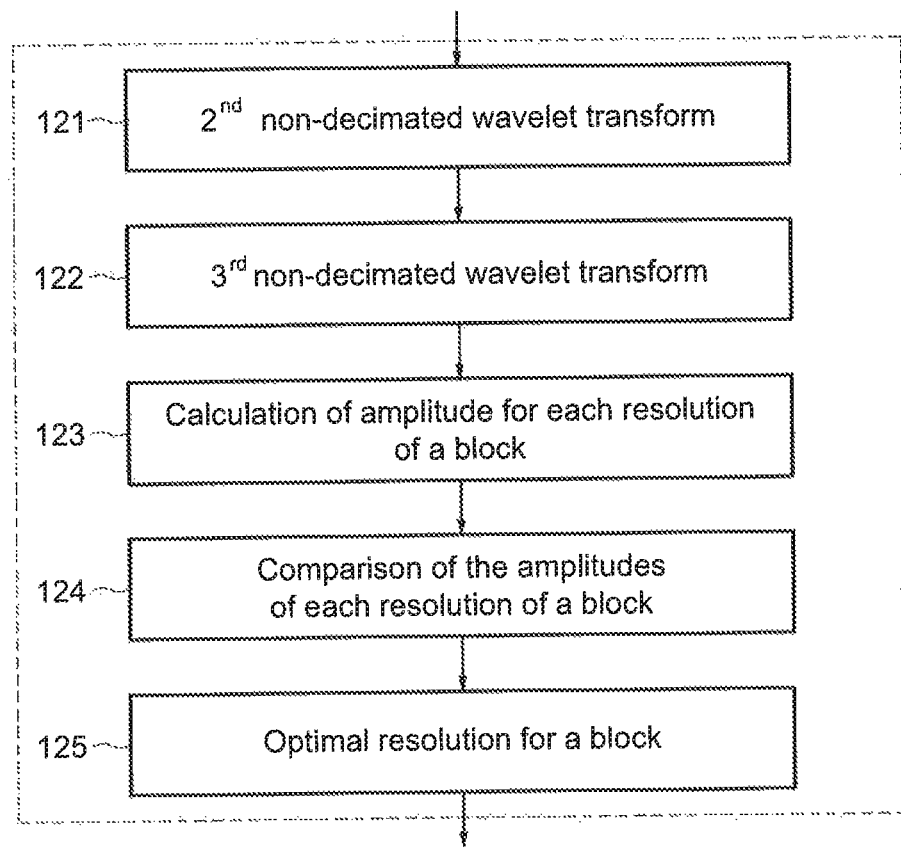
FIG. 3 illustrates in a schematic manner a method for determining the optimal resolution for each primary block, according to one mode of implementation.

FIG. 3 illustrates in a schematic manner a method for determining the optimal resolution for each block according to one mode of implementation, and more particularly in this example of each primary block.

In this example, in steps 121 and 122, two successive additional non-decimated wavelet transforms are carried out on each of the approximate images obtained. On completion of step 122, a frequency-based description at three different resolutions arising from the first, second and third non-decimated wavelet transforms is thus obtained.

The transform in the details space used is a non-decimated transform. In the example a dyadic transform is used. Consequently, the resolution is therefore divided by two at each scale, that is to say at each transform. If J is the scale of a wavelet transform, the scale corresponding to the number of transforms that the image has undergone, the resolution of the transformed spaces decreases as $2^{-J}$.

In a following step 123, the amplitude of the wavelet coefficients is calculated for each resolution for one and the same primary block. By locally choosing the resolution most adapted to each contour, the direction of the contour will thereby be specified. The detail image is segmented into square primary blocks of, for example, 16 pixels by 16 pixels. It is then possible to choose the best resolution for each block, as a function of the type of detail existing within the block.

For a block, the amplitude of the wavelet coefficients, which correspond in this example to the detail coefficients, is calculated for each resolution by calculating for example the difference between the maximum wavelet coefficient and the minimum wavelet coefficient.

In a following step 124, the amplitudes of the wavelet coefficients obtained for each resolution are then compared for one and the same block.

In a final step 125, the optimal resolution of the block is selected, corresponding to the resolution for which the amplitude of the wavelet coefficients is a maximum.

In FIG. 4 is illustrated in a schematic manner, a detection of the predominant direction of contours for each block according to one embodiment.

In a first step 131, a one-dimensional sequence of pixels along a given direction is created on the basis of the pixels making up the two-dimensional block studied.

The sequence of pixels denoted S(θ) is therefore a sequence of consecutive pixels which is representative of the direction θ, taking account optionally of line jumps, containing all the pixels of the block studied. This sequence of pixels is created with the aid of a discrete straight line creation algorithm, such as, for example, that of Bresenham.

In this example, the Bresenham algorithm is chosen to find a chaining to be carried out since the latter has the property of minimizing at each step the error made with respect to the continuous straight line representing the same angle, when chaining together the neighboring pixels.

Figures 5A, 5B, 6:
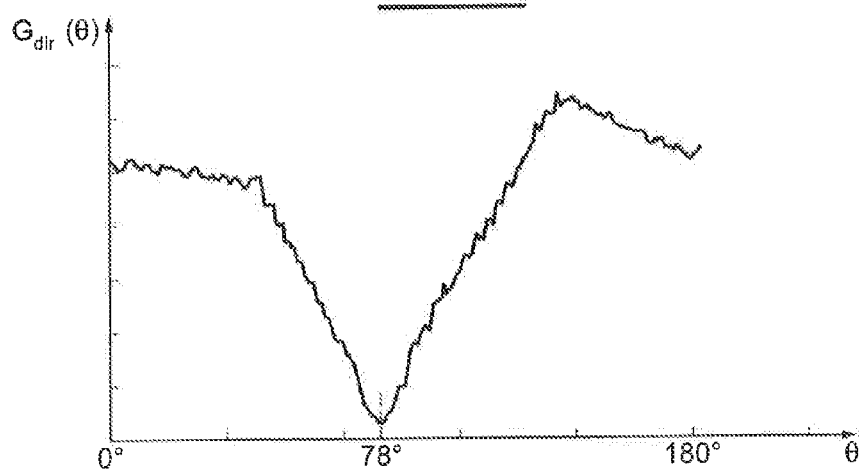
FIGS. 5a and 5b illustrate in a schematic manner the creation of a one-dimensional sequence of pixels along a given direction for a block.
FIG. 6 illustrates the plot of the homogeneity criterion as a function of the angle of the direction of contours for a block.

An example of a creation of a one-dimensional sequence of pixels is given in FIGS. 5a and 5b. The transformation may be seen of a two-dimensional block of pixels, presented in FIG. 5a, into a one-dimensional sequence of pixels, presented in FIG. 5b, following a direction θ represented by the arrows.

The Bresenham algorithm thus makes it possible to chain together the neighboring pixels along a direction θ.

It is interesting to note that the number of Bresenham straight lines that can be created inside a block increases with the size of the block. The angular resolution therefore increases with the size of the block since the number of angles that can be discriminated is bigger. Moreover, searching for the dominant direction over a large number of pixels increases the robustness of the result to possible spurious noise or directions.

In a second step 132, a homogeneity criterion ($G_{dir}$) is calculated for the sequence. The criterion of homogeneity of a direction of a block corresponds, in this example, to the homogeneity of the pixels of the block along the direction, that is to say to the integration over the block of the absolute values of the wavelet coefficient gradients along the direction.

In the sequence created by the Bresenham algorithm, as illustrated in FIG. 5*b*, line jumps may be taken into account in the calculation of the homogeneity criterion. In this case, the wavelet coefficient gradients are therefore calculated for two consecutive pixels along the direction in a block. The gradient of two consecutive pixels in the sequence but belonging to two different lines, therefore being positioned on either side of a line jump, will not be calculated.

To calculate the homogeneity criterion for a sequence, a number of orthogonal wavelet transforms of the sequence, such as Haar wavelet transforms for example, corresponding to the number corresponding to the scale of the block from which one is subtracted is carried out beforehand.

Thus, the sequences containing wavelet coefficients at the resolution $2^{-1}$, i.e. the scale $J=1$, will not be transformed, whereas the sequences at the other resolutions $2^{-2}$ and $2^{-3}$, i.e. the scales $J=2$ and $J=3$, will be transformed respectively once and twice.

The concept of continuity along a direction $\theta$ is therefore calculated in the following manner through the calculation of the homogeneity criterion, with $WT_J(S(\theta))$ the orthogonal wavelet transform of $S(\theta)$ at the resolution $2^{-J}$.

$$G_{dir}(\theta) = \sum_{i=1}^{N^2-1} |WT_{J-1}(S(\theta)[i+1]) - WT_{J-1}(S(\theta)[i])| \quad (2)$$

In a following step 133, it is verified that the calculation of the homogeneity criterion of a direction has been carried out for all the possible directions of the block. If such is not the case, then steps 131 and 132 are recommenced for a different direction, doing so until all the possible directions of the block have been carried out.

Once the sequences of pixels have been created for all the possible directions in the block and the homogeneity criteria have been calculated for all the directions, the homogeneity criteria thus calculated are compared in a step 134.

It is possible to carry out the search for the minimum in parallel with the calculation of the homogeneity criterion $G_{dir}(\theta)$ together with gradual updating of the minimum.

In a following step 135, the principal direction of the block is then selected, the principal direction corresponding to the direction for which the homogeneity criterion ($G_{dir}(\theta)$) for the sequence of pixels is a minimum.

In FIG. 6 is illustrated an exemplary plot of the homogeneity criteria $G_{dir}(\theta)$ for a block. The minimum is attained for an angle $\theta=78°$ which corresponds in this example to the principal direction.

In a following step 136, a homogeneity threshold $G_{ort}$ of a block is then calculated, corresponding in this example to the integration over the block of the absolute values of the vertical and horizontal gradients of wavelets coefficients.

In a following step 137, the principal-direction homogeneity criterion $G_{dir}$ selected in step 135 is compared with a fraction of the homogeneity threshold $G_{ort}$ calculated in step 136. In this example, the homogeneity threshold is divided by $\alpha$, $\alpha$ possibly being for example equal to 5.

If the criterion is complied with, that is to say if the inequality is satisfied in step 137, then the predominant direction of the block which corresponds to the principal direction selected in step 135 is selected in a step 140.

On the other hand, if the condition of step 137 is not satisfied, then a following step 138 checks that the size of the block studied has not attained the minimum block size, such as for example a minimum size of 4×4 pixels.

If the block size corresponds to the minimum block size, then we go to step 140 of selecting the predominant direction.

Otherwise, a segmentation of the block is carried out in a following step 139, so as to divide the block into four square divisional blocks of equal dimensions. Once the block has been segmented into four square blocks, we return to the first step 131 and again perform the method for detecting the predominant direction of contours for each of the divisional blocks, in an independent manner, until obtaining a predominant direction for each of the blocks ultimately obtained.

In another mode of implementation, the sequence of pixels is not recalculated at each division, but is deduced from the sequence of pixels of the primary block. The same goes for the calculation of the homogeneity criterion $G_{dir}(\theta)$ which is deduced from the homogeneity criterion $G_{dir}(\theta)$.

It is possible to obtain an image divided into blocks of various sizes, each block having a single predominant direction.

Figure 7A:
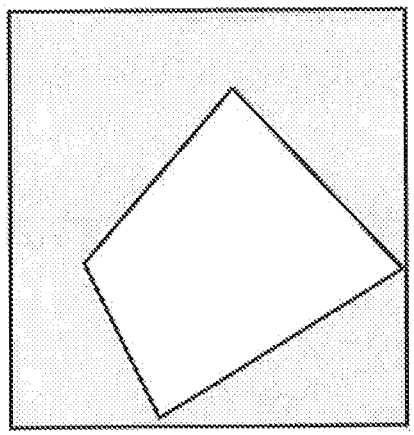
FIGS. 7a and 7b illustrate in a schematic manner an optimal splitting into blocks of various dimensions, obtained for an image.
Figure 7B:
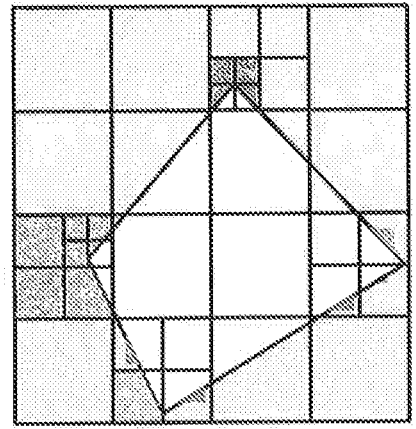

In FIGS. 7*a* and 7*b* is illustrated a segmentation of an image into primary blocks and divisional blocks. The division of the image into blocks of different sizes is carried out so as to obtain at the most only a single contour direction in a block. The image 7*a* is first of all divided into primary blocks of identical size, and then each primary block is analyzed to detect a principal direction.

Each primary block comprising more than one contour direction is divided into four equal square divisional blocks. Each of these four divisional blocks is in its turn analyzed to detect a principal direction.

If one of the divisional blocks comprises more than one contour direction, this block is then segmented into smaller divisional blocks. In the example illustrated, a square primary block is divided, as required, into four smaller equal square divisional blocks.

This segmentation process is effected until the homogeneity criterion is below the homogeneity threshold, this corresponding to a strong probability of having a single contour direction in the block, or that the block has attained a size considered to be a minimum.

In FIGS. 8*a* and 8*b* is illustrated a similar, but nonetheless different, approach to constructing a sequence of pixels which is used in the document of Mallat using bandlets. A single direction is associated with each block; however, instead of chaining the neighboring pixels of a block along a director line, as in the case of a chaining of the neighboring pixels along a Bresenham line, a rotation matrix is applied to the matrix comprising the indices of the block. Let $\omega$ be the angle of rotation, the pixels are chained in order of proximity with respect to the continuous line of angle $\omega$.

It may be noted that, unlike Bresenham, the chained pixels are no longer neighboring, but the sequences of pixels remain similar in terms of colors.

The procedure used to create the sequence of pixels of FIG. 8*b* is not an optimal procedure for detecting directions on account of the fact that the procedure has a tendency too often to detect directions termed "basis directions", that is to say 0°, 45°, 90°; 135°, 180°.

This phenomenon may be observed in FIGS. 9a and 9b, for which the detection of contour direction is applied to a blurry circle.

We would expect that no direction is favored and that the graphical representation of the homogeneity criterion $G_{dir}(\theta)$ is flat, thus showing that there is the same homogeneity.

Curve $d_1$ represents the graphical representation of the homogeneity criterion $G_{dir}(\theta)$, obtained using the prior art pixel sequence creation procedure, i.e. that not using the straight lines chaining together neighboring pixels, such as Bresenham straight lines, for all the directions. Contrary to what is expected, spikes of minima are observed for the four basis directions, thereby indicating that the basis directions have a higher probability of being detected.

This effect is due to the fact that for basis angles, the chained pixels are geographically closer together than for other directions. The consequence of this is that inside a block, more correct chainings of pixels may be obtained for the "basis" directions, in contradistinction to the less correct chainings obtained for non-basic directions.

Curve $d_2$ represents the graphical representation of the homogeneity criterion $G_{dir}(\theta)$, obtained according to the invention, therefore using an algorithm chaining together the neighboring pixels such as the Bresenham algorithm, for all the directions. The curve obtained is not perfectly flat, but the defects observed are much less with respect to the prior art.

FIG. 10 presents in a schematic manner an embodiment of a system 1 for detecting orientation of contours in an image.

The system 1 comprises means 10 of initial transformation of the image which carry out a non-decimated wavelet transformation of the image or, generally, a multi-resolution transformation. It also comprises means 20 of primary segmentation dividing the image into a plurality of primary blocks.

The system 1 also comprises means 30 for determining the optimal resolution for each primary block. The means 30 for determining the optimal resolution comprise means 31 of additional transformations making it possible to carry out at least one second transform, for example non-decimated wavelet transform, of the image, or, generally, a multi-resolution transformation, first calculation means 32 making it possible to calculate an amplitude of the wavelet coefficients for each resolution, and first comparison means 33 able to compare the amplitudes of the wavelet coefficients and to select the optimal resolution corresponding to the resolution for which the amplitude of the wavelet coefficients is a maximum.

The system 1 finally comprises means 40 for detecting the predominant direction of contour for each of the primary blocks or for divisional blocks arising from at least one division of the primary blocks.

The means 40 for detecting the predominant direction of contour of a block comprise means for detecting a principal direction of the block comprising means 41 for creating a sequence of pixels for each possible direction in the block, second calculation means 42 making it possible to calculate a homogeneity criterion for each sequence of pixels, and second comparison means 43 able to compare the criteria of homogeneities of a block and to select the principal direction of the block, the principal direction corresponding to the direction for which the criterion of homogeneity of the sequence of pixels is (a minimum).

The means 41 for creating a sequence of pixels for a direction in the block comprise means able to construct a sequence of pixels on the basis of the Bresenham algorithm or of any other algorithm chaining together the neighboring pixels.

The second calculation means 42 comprise means carrying out a number of orthogonal wavelet transforms of the sequence corresponding to the number corresponding to the scale of the block from which one is subtracted.

The means 40 for detecting the predominant direction of contour of a block also comprise means for testing satisfaction of a direction criterion for the block comprising third calculation means 44 calculating a homogeneity threshold corresponding to the integration over the block of the absolute values of the vertical and horizontal or diagonal gradients of wavelet coefficients, and third comparison means 45 able to compare the homogeneity criterion delivered by the second comparison means with the homogeneity threshold and to compare the size of the block with a minimum threshold of block size.

Finally, the means 40 for detecting the predominant direction of contour of a block comprise means 46 for segmenting the block into divisional blocks.

All these means may be embodied by software modules within a processor and/or by logic circuits.

Numerous applications can exploit such an invention. The principal applications are:
 image enlargement. The directions of the contours give the sense in which an interpolation may be performed while limiting to the maximum the risk of blurring the enlarged image, and the risk of the staircase effect;
 image restoration (denoising, deblurring, anti-aliasing). The fact of ascertaining the direction of the contours may be very useful in applications of this kind. Indeed, for denoising, the direction of the contour represents the direction of maximum homogeneity. It is therefore possible to distinguish the high frequencies corresponding to contours, from the frequencies corresponding to the noise to be decreased. It is thus possible to limit the losses of definition that are often attributable to denoising or anti-aliasing techniques.
 inpainting, consisting in filling in areas of the image where the content has been erased. The use of the invention may turn out to be effective for inpainting in textures or in areas of the image where the information is carried principally by one direction. It is thus possible to lengthen the patterns of the texture in the detected direction;
 compression which may be improved by taking into account the geometry of the image so as to code the objects of the image in a more effective manner.

What is claimed is:

1. A method for detecting orientation of contours in an image, comprising:
   transforming the image using a non-decimated multi-resolution transform;
   segmenting the image into a plurality of blocks, wherein the plurality of blocks comprise square blocks each having a predominant direction of contour;
   determining an optimal resolution for each block; and
   detecting the predominant direction of contour for each of the square blocks.

2. The method according to claim 1, wherein the blocks constitute divisional square blocks resulting from a division of larger square blocks lacking the predominant direction of contour, and in which only a single predominant direction of contour is detected for each of the divisional square blocks.

3. The method according to claim 1, wherein determining the optimal resolution comprises: further performing at least one additional non-decimated multi-resolution transform of the image, calculating detail coefficients for each of said transforms, comparing detail coefficients for corresponding blocks in different transforms, and selecting as the optimal resolution for the corresponding block a resolution at which the compared detail coefficients are at a maximum.

4. A method for detecting orientation of contours in an image, comprising:
  transforming the image using a non-decimated multi-resolution transform;
  segmenting the image into a plurality of blocks;
  determining an optimal resolution for each block, wherein determining the optical resolution comprises:
    calculating an amplitude of detail coefficients at a plurality of resolutions, and
    selecting as the optimal resolution the resolution for which the amplitude of the detail coefficients is a maximum; and
  detecting a predominant direction of contour for each of the blocks.

5. The method according to claim 1, wherein detecting the predominant direction of contour of a block comprises:
  a) detecting a principal direction of the block,
  b) testing satisfaction of a direction criterion for the block,
  c) selecting the principal direction as predominant direction of the block if the direction criterion is satisfied,
  d) segmenting the block into four divisional blocks, if the direction criterion is not satisfied in step b),
  e) repeating steps a) to d) until the direction criterion is satisfied.

6. The method according to claim 5, wherein the detection of a principal direction of a block comprises:
  creating a sequence of pixels for each possible direction in the block,
  calculating a homogeneity criterion for each sequence of pixels,
  selecting the principal direction of the block, the principal direction corresponding to the direction for which the criterion of homogeneity of the sequence of pixels corresponds to a maximum homogeneity.

7. The method according to claim 6, wherein the criterion of homogeneity of a direction of a block corresponds to the integration over the block of the absolute values of the wavelet coefficient gradients along the direction.

8. The method according to claim 6, wherein calculating the homogeneity criterion for a sequence comprises performing a number of orthogonal wavelet transforms of the sequence corresponding to the number corresponding to the scale of the block from which one is subtracted.

9. The method according to claim 5, wherein the direction criterion for a block comprises a minimum block size and/or a criterion of homogeneity below a homogeneity threshold.

10. The method according to claim 6, wherein the homogeneity threshold for a block corresponds to the integration over the block of the absolute values of the intrinsic gradients of detail coefficients of the block such as the vertical and horizontal gradients of detail coefficients.

11. The method according to claim 6, wherein the creation of a sequence of pixels for a direction in the block is carried out on the basis of an algorithm chaining together the neighboring pixels.

12. A system for detecting orientation of contours in an image, comprising:
  a transformer operable to transform the image by carrying out a non-decimated multi-resolution transformation of the image;
  a segmenter operable to segment the image into a plurality of blocks, wherein the plurality of blocks comprise square blocks each having a predominant direction of contour;
  a determiner operable to determine an optimal resolution for each block; and
  a detector operable to detect the predominant direction of contour for each of the square blocks.

13. The system according to claim 12, wherein the determiner is further operable to carry out additional transformations comprising at least one additional non-decimated multi-resolution transform of the image, calculate detail coefficients for each of said transforms, compare detail coefficients for corresponding blocks in different transforms, and select as the optimal resolution for the corresponding block a resolution at which the compared detail coefficients are at a maximum.

14. A system for detecting orientation of contours in an image, the system comprising:
  a transformer operable to transform the image by carrying out a non-decimated multi-resolution transformation of the image;
  a segmenter operable to segment the image into a plurality of blocks;
  a determiner operable to determine an optimal resolution for each block, wherein the determiner comprises a first calculator operable to calculate an amplitude of the detail coefficients at a plurality of resolutions, and a first comparator operable to compare the amplitudes of the detail coefficients, and a selector operable to select as the optimal resolution the resolution for which the amplitude of the detail coefficients is a maximum; and
  a detector operable to detect the predominant direction of contour for each of the plurality of blocks.

15. The system according to claim 12, wherein the detector is further operable to detect a principal direction of the block, test satisfaction of a direction criterion for the block, select the principal direction as the predominant direction if the direction criterion is satisfied, and segment the block into divisional blocks if the direction criterion is not satisfied.

16. The system according to claim 15, wherein the detector is further operable to create a sequence of pixels for each possible direction in the block, calculate a homogeneity criterion for each sequence of pixels, and compare the criteria of homogeneities of a block and to select the principal direction of the block, the principal direction corresponding to the direction for which the criterion of homogeneity of the sequence of pixels corresponds to a maximum homogeneity.

17. The system according to claim 16, wherein the calculation of the homogeneity criterion comprises carrying out a number of orthogonal wavelet transforms of the sequence corresponding to the number corresponding to the scale of the block from which one is subtracted.

18. The system according to claim 16, wherein testing satisfaction comprises calculating a homogeneity threshold corresponding to the integration over the block of the absolute values of the intrinsic gradients of detail coefficients such as vertical and horizontal gradients of detail coefficients.

19. The system according to claim 16, wherein testing satisfaction comprises comparing the homogeneity criterion with the homogeneity threshold and comparing the size of the block with a minimum threshold of block size.

20. The system according to claim 16, wherein creating a sequence of pixels for a direction in the block comprises constructing a sequence of pixels on the basis of an algorithm chaining together the neighboring pixels.

* * * * *

UNITED STATES PATENT AND TRADEMARK OFFICE
CERTIFICATE OF CORRECTION

PATENT NO. : 8,687,897 B2  
APPLICATION NO. : 12/983643  
DATED : April 1, 2014  
INVENTOR(S) : Eric Van Reeth et al.

Page 1 of 1

It is certified that error appears in the above-identified patent and that said Letters Patent is hereby corrected as shown below:

On the Title Page:

Please correct the inventor's name in Item (75) as follows:

Eric Van Reeth, Grenoble (FR); Pascal Bertolino, Seyssinet-Pariset (FR); ~~Nicolas~~ Marina Nicolas, Voreppe (FR)

Signed and Sealed this  
Seventeenth Day of June, 2014

Michelle K. Lee  
*Deputy Director of the United States Patent and Trademark Office*